(12) United States Patent
Burnette

(10) Patent No.: US 9,288,947 B1
(45) Date of Patent: Mar. 22, 2016

(54) FOLDING HANDSAW PACK-POLE SYSTEMS

(71) Applicant: Ronald Burnette, Rockmart, GA (US)

(72) Inventor: Ronald Burnette, Rockmart, GA (US)

( * ) Notice: Subject to any disclaimer, the term of this patent is extended or adjusted under 35 U.S.C. 154(b) by 121 days.

(21) Appl. No.: 14/445,453

(22) Filed: Jul. 29, 2014

(51) Int. Cl.
*A01G 3/08* (2006.01)
*B27B 21/02* (2006.01)

(52) U.S. Cl.
CPC .............. *A01G 3/083* (2013.01); *B27B 21/02* (2013.01)

(58) Field of Classification Search
CPC .............................. A01G 3/083; B27B 21/02
USPC ................................................. 30/155, 161
See application file for complete search history.

(56) References Cited

U.S. PATENT DOCUMENTS

| | | | |
|---|---|---|---|
| 1,385,671 A | 7/1921 | Boro | |
| 1,769,400 A | 7/1930 | Talmage | |
| 2,431,235 A | 11/1947 | Flaa | |
| 2,762,407 A * | 9/1956 | McCord, Jr. | B23D 1/10 30/519 |
| 3,727,956 A * | 4/1973 | Popeil | A47L 11/4075 285/398 |
| 4,148,140 A * | 4/1979 | Lile | B26B 1/046 30/161 |
| 4,411,068 A * | 10/1983 | Theodorides | B23D 49/14 30/166.3 |
| 4,535,539 A * | 8/1985 | Friedman | B26B 1/046 30/159 |
| 4,700,420 A * | 10/1987 | Belanger | B25F 1/02 182/100 |
| 4,716,653 A * | 1/1988 | Skyba | A01G 3/08 16/DIG. 25 |
| D306,817 S * | 3/1990 | McMorrough | A01G 3/08 D8/107 |
| 4,979,301 A * | 12/1990 | Walker | B26B 1/046 30/161 |
| 5,848,474 A * | 12/1998 | Fortney | B23D 51/10 279/97 |
| 5,860,216 A * | 1/1999 | Shellnutt | B23D 51/10 30/166.3 |
| 6,088,860 A * | 7/2000 | Poehlmann | B25F 1/003 30/161 |
| D440,855 S * | 4/2001 | Wang | A01G 3/08 D8/107 |
| 6,345,445 B1 * | 2/2002 | Schofield | A01G 3/0255 30/245 |
| 6,438,848 B1 * | 8/2002 | McHenry | B26B 1/048 30/160 |
| 6,742,264 B1 * | 6/2004 | Urion | B23D 51/10 30/166.3 |
| 7,219,436 B1 * | 5/2007 | Barry | B23D 49/12 30/295 |
| 8,752,298 B2 * | 6/2014 | Collins | B26B 1/044 30/160 |
| 8,905,696 B2 * | 12/2014 | Lapointe | B25G 3/00 16/426 |
| 2009/0165309 A1 * | 7/2009 | Kamb | B26B 5/00 30/161 |
| 2012/0023753 A1 * | 2/2012 | Wen | B26B 1/046 30/156 |
| 2014/0090256 A1 * | 4/2014 | Pringnitz | B27B 21/04 30/161 |
| 2014/0190016 A1 * | 7/2014 | Pringnitz | B27B 21/04 30/151 |
| 2015/0245564 A1 * | 9/2015 | D'Acquisto | B23D 49/14 30/161 |
| 2016/0000017 A1 * | 1/2016 | Pringnitz | B25G 1/04 144/343 |

* cited by examiner

*Primary Examiner* — Sean Michalski
(74) *Attorney, Agent, or Firm* — RG Patent Consulting, LLC; Rachel Gilboy

(57) ABSTRACT

A folding handsaw pack-pole system is a folding pruning saw that a hunter or woodsman may conveniently carry folded and may carry in a sheath having a belt loop, for trimming branches from thick foliage or wooded area to clear lanes through the woods for shooting. The handle has a pole receiver so that the hunter doesn't have to carry a long extension handle with him into the woods, but rather cuts an appropriately sized branch to slide into the pole receiver to cut high branches that are normally beyond the user's reach without such an extension.

19 Claims, 5 Drawing Sheets

FOLDING HANDSAW PACK-POLE SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of folding hand saws and more specifically relates to a folding handsaw pack-pole system.

DESCRIPTION OF THE RELATED ART

Hunting and fishing is an activity that many people in many countries regularly engage in. Hunting is regulated in most countries to manage the wild game population and maintain healthy populations of the hunted game animal. One method of regulation is to create seasons in which only certain types of hunting weapons are allowed. There are rifle seasons, musket seasons, bow seasons, and perhaps others, each of which is designed to ensure the playing field is level for all hunters participating. In some types of hunting, such as big game hunting, the hunter must be skilled and know how to hunt the particular animal or he or she will go home empty handed. This is particularly true with bow hunting. Patience and the ability to properly camouflage oneself are important skills. Hunters that remain still are more likely to see other movement than a moving hunter is. The use of tree stands is one method of remaining still and hunting from a vantage point.

When hunting in new, deep wooded areas, hunters may be required to clear away tree limbs before setting up their tree stands. Without removing these excess tree limbs, hunters may not have clear shooting lanes, and may be unable to hunt. However, in order to clear away the limbs, hunters may need to use large pole saws. Carrying these saws into and out of the woods can be an arduous, difficult task, and may add to a hunter's already heavy load of equipment. Hand saws most often create the need for hunters to have to climb to reach limbs that need to be cleared to create an open lane for hunting from a vantage point such as a tree stand, or just leave them altogether. An effective solution is necessary.

Various attempts have been made to solve the above-mentioned problems such as those found in U.S. Pub. No. 5,860,216 to Timothy D. Shellnutt, U.S. Pat. No. 4,716,653 to Helmut K. Skyba, U.S. Pat. No. 4,700,420 to John Belanger, U.S. Pat. No. 2,431,235 to Leonard Flaa, U.S. Pat. No. 1,769,400 to Talmage Josiah S, and U.S. Pat. No. 1,385,671 to William A Boro. This art is representative of folding saws. None of the above inventions and patents, taken either singly or in combination, is seen to describe the invention as claimed.

Ideally, a folding hand saw should provide convenience of carrying while allowing the user to easily cut high branches and yet, would operate reliably and be manufactured at a modest expense. Thus, a need exists for a reliable folding handsaw pack-pole system to avoid the above-mentioned problems.

BRIEF SUMMARY OF THE INVENTION

In view of the foregoing disadvantages inherent in the known folding saw art, the present invention provides a novel folding handsaw pack-pole system. The general purpose of the present invention, which will be described subsequently in greater detail, is to provide a conveniently carried saw that allows a user to easily cut high branches that would normally be beyond the user's reach.

The present invention, folding handsaw pack-pole system, as disclosed herein preferably comprises: a folding saw assembly having a saw blade with a first end having a first hinge orifice, a second end having a tip and a cutting edge, a pivot hinge with a hinge release button, a handle comprising a left side, a right side, a proximate end having a pole receiver with a wood screw, a distal end comprising a second hinge orifice, and a grip.

The folding hand saw pack pole system comprises a folding saw assembly that may be used by a hunter to compactly carry the folding saw assembly in a folded position to a location of use to cut wood (or other suitable material). The folding saw assembly may be a total of about 17 inches long in a fully extended position and the cutting edge may be about 7 inches long by itself, and comprise a plurality of cutting teeth. The plurality of cutting teeth on the cutting edge each may comprise a high inverted M-profile. The saw blade is pivotally attached to the handle such that the saw blade is able to be nestably folded substantially within the handle between the right side and the left side of the handle for safely-concealing the cutting edge. The saw blade may comprise a flat shank having the first hinge orifice located within the first end of the saw blade such that the pivot hinge is able to pivotally attach the first hinge orifice to the second hinge orifice of the distal end of the handle. The second end of the saw blade comprises a tip adjacently located to the cutting edge, the cutting edge located between the first end and the second end of the saw blade along an inside edge. The saw blade comprises a blade back having a curvature arcuately extending progressively toward the cutting edge from the first end, and increasingly curves within about an inch from the second end to intersect the cutting edge at the tip (giving the blade strength for in-use longevity). The cutting edge may comprise a slight inwardly arcuate profile and the saw blade comprises tempered steel and is durable for heavy saw-cutting use.

The hinge release button is located adjacent to the pivot hinge on a back spine of the handle and comprises a hinged thumb lever that is hingedly operational in a movement coplanar with the back spine of the handle. The pivot hinge together with the hinge release button may comprise multiple blade lock positions. The hinge release button is able to lock the pivot hinge, and therefore the saw blade in a folded position and alternately in an open position in relation to the handle.

The handle comprises a forward handle portion located at the distal end of the handle and a pole receiver portion located at the proximate end of the handle. The handle comprises hardened plastic such that the folding saw assembly is reasonably light weight and of sufficient strength to resist bending. The forward handle portion is about 1 inch thick and may comprise a cross-sectional profile having a width greater than the thickness. The proximate end of the handle comprises a pole receiver which comprises a cylindrical inner volume having a circular opening at the proximate end so that the pole receiver is able to receive a pole-branch cut from a tree at a location of use for use as a handle extension. Fastening/securing means such as clamps, bands or the like may be used to secure the branch in place; however friction-fit may be used or mechanical fastening means.

The folding saw assembly with an attached pole-branch allows a user to reach stalk vegetation to be cut, that is beyond a normal arms reach of a user. The pole receiver portion of the handle is about 4 inches long and about 1½ inches inside diameter and comprises a cylindrical shape with the pole receiver portion larger in size than the forward handle portion. The wood screw (or other suitable equivalent) is concentrically located and non-removably attached to the recess end of the handle, the recess end interiorly located within the pole receiver with the point of the wood screw facing outwardly toward the proximate end. The wood screw may be about 1½ inches long and comprise steep threads so that the pole-branch is able to be quickly and rotationally twist-inserted into the pole receiver with the wood screw threadably-piercing the end of the pole-branch for firm attachment.

The grip of the handle may comprises a non-slip surface about the outer periphery, such as rubber, molding to fit the hand, or knurling, so that a user is able to leverage-grip the handle to prevent an axial rotation of the handle during use. These features allow the user to use the folding saw assembly for conveniently carrying in a folded condition while walking or traveling so that the user is unencumbered and able to carry other objects or simultaneously perform other tasks. A kit is embodied herein for the folding handsaw pack-pole system preferably comprising at least one fully assembled folding saw assembly, at least one carrying case, and at least one set of user instructions.

In accordance with the embodiments of the present invention a preferred method of use is disclosed herein preferably comprising the steps of: carrying a folded folding saw assembly in a carrying case to a location of use, removing the folding saw assembly from the case, unfolding the folding saw assembly, using the folding saw assembly to cut a branch-pole for use as an extension handle, twist-inserting the cut branch-pole into a pole receiver within the handle of the folding saw assembly, using the folding saw assembly with an attached branch-pole for cutting vegetation branches that are beyond a user's unaided reach to clear a path for unobstructed shooting of a game animal, twist-removing the branch-pole and discarding, folding and inserting the folding saw assembly into the carrying case, and storing the folding saw assembly.

The present invention holds significant improvements and serves as a folding handsaw pack-pole system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, folding handsaw pack-pole system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a folding saw and more particularly to a folding handsaw pack-pole system as used to improve the convenience of carrying the saw and the ease of cutting high branches that would normally be beyond a user's reach, yet allowing the saw to be easily carried.

Generally speaking, a folding handsaw pack-pole system is a folding pruning saw that a hunter or woodsman may conveniently carry folded and may carry in a sheath having a belt loop, for trimming branches from thick foliage or wooded area to clear lanes through the woods for shooting. The handle has a pole receiver so that the hunter doesn't have to carry a long extension handle with him into the woods, but rather cuts an appropriately sized branch to slide into the pole receiver to cut high branches that are normally beyond the user's reach without such an extension.

Figure 1:
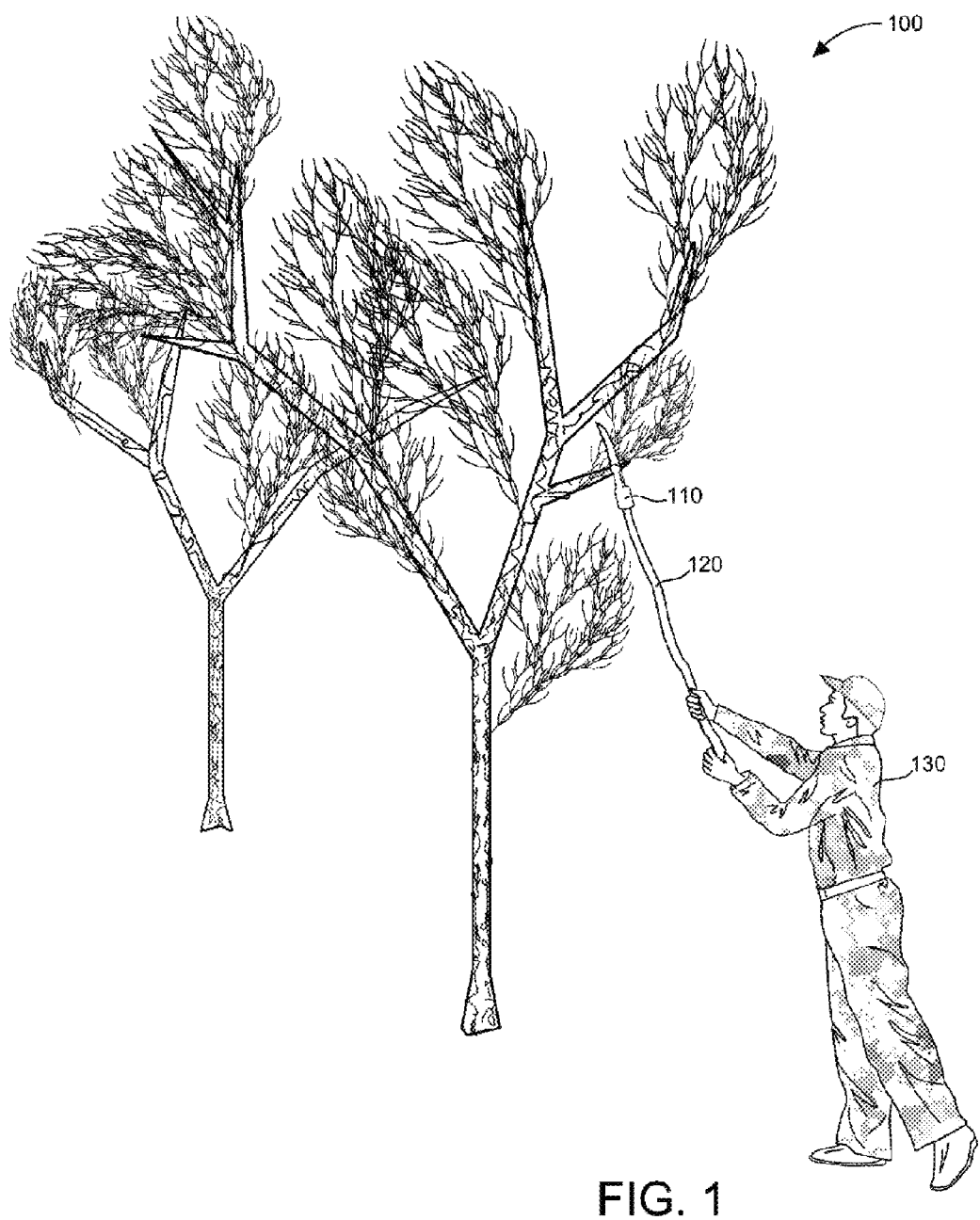
FIG. 1 shows a perspective view illustrating an in use condition of a folding handsaw pack-pole system according to an embodiment of the present invention.

Referring to the drawings by numerals of reference there is shown in FIG. 1, a perspective view illustrating an in use condition of folding handsaw pack-pole system 100 according to an embodiment of the present invention.

The present invention, folding handsaw pack-pole system 100 for use with an attached pole-branch 120 allows a user to reach stalk vegetation such as branches or brush to be cut, that is beyond a normal arms reach of user 130. Folding saw assembly 110 may be used by a hunter to compactly carry in a folded position to a location for use to cut wood. Folding saw assembly 110 may be a total of about 17 inches long in a fully extended position and cutting edge 140 may be about 7 inches long by itself, and comprise a plurality of cutting teeth 150. These features allow user to use folding saw assembly 110 for conveniently carrying in a folded condition while walking or traveling (hiking or the like) such that user 130 is effectively unencumbered and able to carry other objects or simultaneously perform other tasks.

Figure 2A:
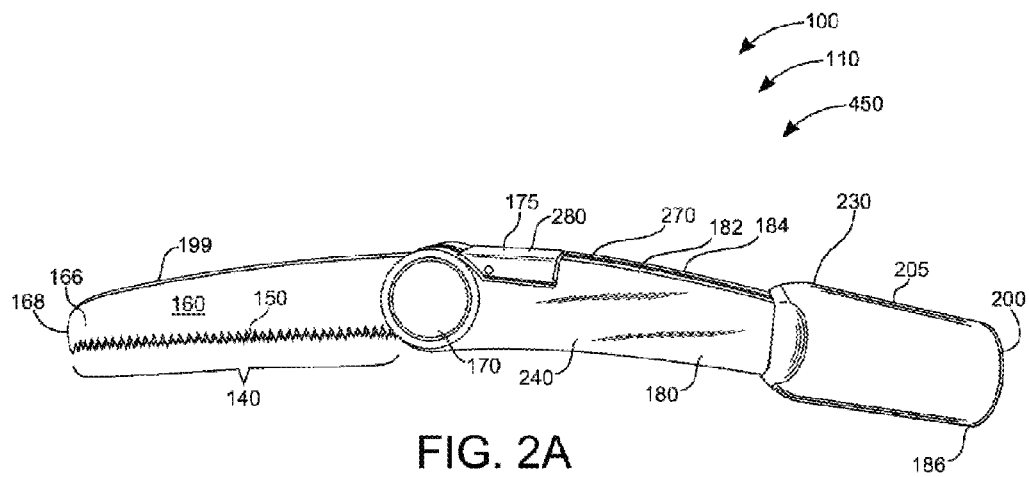
FIG. 2A is a side elevation view illustrating an open position of the folding handsaw pack-pole system according to an embodiment of the present invention of FIG. 1.
Figure 2B:
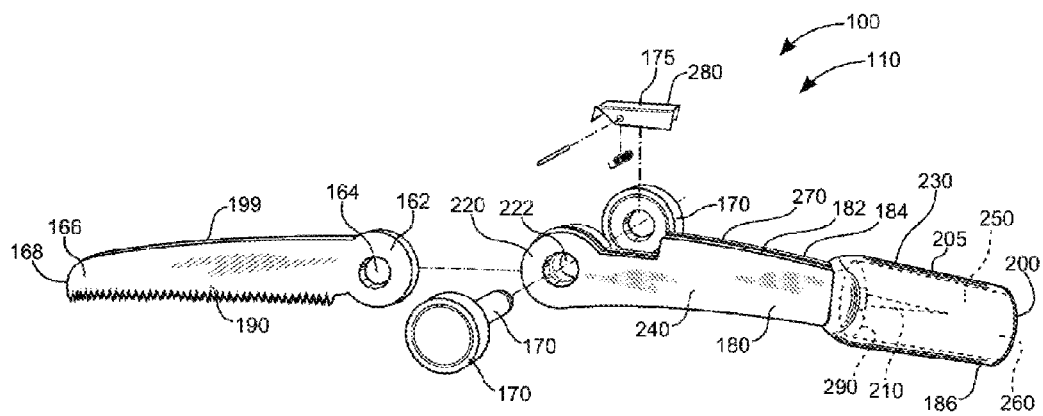
FIG. 2B is a side elevation view illustrating an open and exploded view of the folding handsaw pack-pole system according to an embodiment of the present invention of FIG. 1.

Referring now to FIGS. 2A and 2B, side elevation views illustrating an open position of folding handsaw pack-pole system 100 according to an embodiment of the present invention of FIG. 1.

Folding handsaw pack-pole system 100, preferably comprises: folding saw assembly 110 having saw blade 160 with first end 162 having first hinge orifice 164, second end 166 having tip 168 and cutting edge 140, pivot hinge 170 with hinge release button 175, handle 180 comprising left side 182, right side 184, proximate end 186 having pole receiver 200 with wood screw 210, distal end 220 comprising second hinge orifice 222, and grip 230.

Second end 166 of saw blade 160 comprises tip 168 adjacently located to cutting edge 140 which is located between first end 162 and second end 166 of saw blade 160 along inside edge 190. Saw blade 160 comprises blade back 199 having a curvature arcuately extending progressively toward cutting edge 140 from first end 162, and increasingly curves within about an inch from second end 166 to intersect cutting edge 140 at tip 168. Cutting edge 140 may comprise a slight inwardly arcuate profile. Saw blade 160 may comprise tempered steel and is durably designed for heavy saw-cutting use.

Cutting teeth 150 on cutting edge 140 each may resemble a high inverted M-profile. Saw blade 160 is pivotally attached to handle 180 such that saw blade 160 is able to be nestably folded substantially within handle 180 between right side 184 and left side 182 of handle 180 for safely-concealing cutting edge 140.

Figure 3:
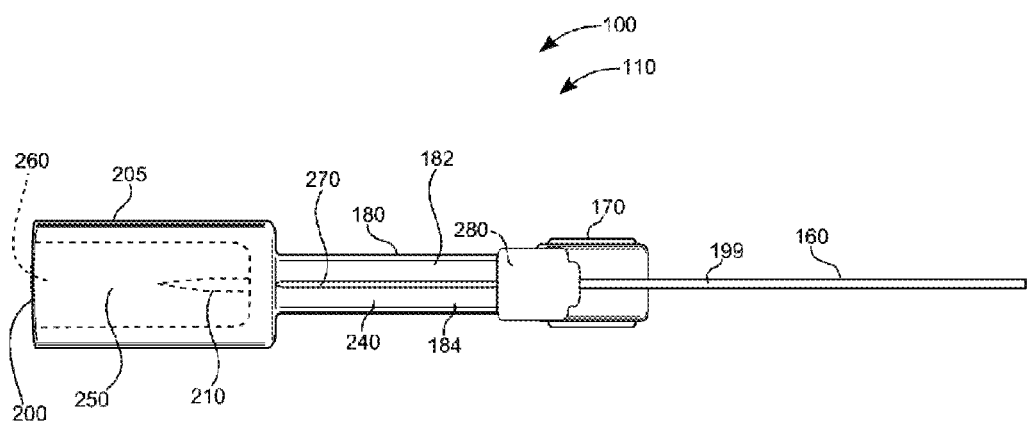
FIG. 3 is a back elevation view illustrating an open position of the folding handsaw pack-pole system according to an embodiment of the present invention of FIG. 1.

Referring now to FIG. 3, a back elevation view illustrating an open position of folding handsaw pack-pole system 100 according to an embodiment of the present invention of FIG. 1.

Saw blade 160 may comprise a flat shank having first hinge orifice 164 located within first end 162 of saw blade 160 such that pivot hinge 170 is able to pivotally attach first hinge orifice 164 to second hinge orifice 222 of distal end 220 of handle 180. Forward handle portion 240 is about 1 inch thick and may comprise a cross-sectional profile having a width greater than the thickness. Proximate end 186 of handle 180 comprises pole receiver 200 which comprises cylindrical inner volume 250 having a circular opening 260 at proximate end 186 so that pole receiver 200 is able to receive pole-branch 120 cut from a tree at a location of use for use as a handle extension.

Grip 230 of handle 180 may comprises a non-slip surface about the outer periphery in preferred embodiments, such as rubber, molding to fit the hand, or knurling (or the like), so that user 130 is able to leverage-grip handle 180 to prevent an axial rotation of handle 180 during use.

Figure 4:
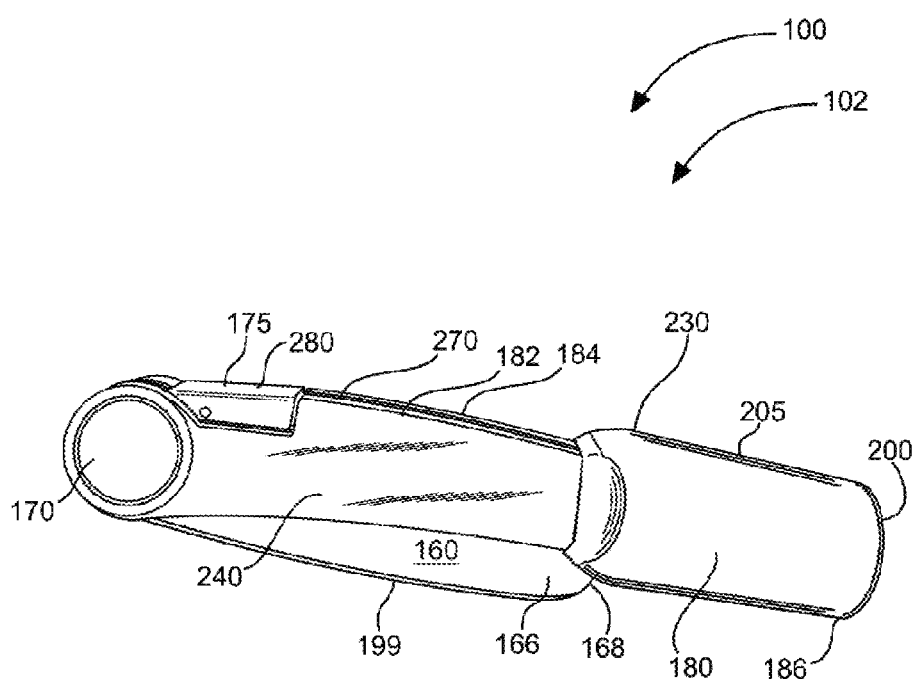
FIG. 4 is a side folded position view illustrating folding handsaw pack-pole system according to an embodiment of the present invention of FIG. 1.

Referring now to FIG. 4, showing a side folded position view illustrating folding handsaw pack-pole system 100 according to an embodiment of the present invention of FIG. 1.

Hinge release button 175 is located adjacent to pivot hinge 170 on back spine 270 of handle 180 and comprises hinged thumb lever 280 that is hingedly operational in a movement coplanar with back spine 270 of handle 180. Pivot hinge 170 together with hinge release button 175 may comprise multiple blade lock positions. Hinge release button 175 is able to lock pivot hinge 170, and therefore saw blade 160 in a folded position and alternately in an open position in relation to handle 180.

Handle 180 comprises forward handle portion 240 located at distal end 220 of handle 180 and pole receiver portion 205 located at proximate end 186 of handle 180. Handle 180 comprises hardened plastic such that folding saw assembly 110 is light weight and of sufficient strength to resist bending.

Pole receiver portion 205 of handle 180 is about 4 inches long and about 1½ inches in inside diameter and comprises a cylindrical shape with pole receiver portion 205 larger in size than forward handle portion 240. Wood screw 210 is concentrically located and non-removably attached to recess end 290 of handle 180, recess end 290 is interiorly located within pole receiver 200 with the point of wood screw 210 facing outwardly toward proximate end 186. Wood screw 210 may be about 1½ inches long and comprise steep threads so that pole-branch 120 is able to be quickly and rotationally twist-inserted into pole receiver 200 with wood screw 210 threadably-piercing the end of pole-branch 120 for a firm attachment.

Folding handsaw pack-pole system 100 may be sold as kit 450 comprising the following parts: at least one fully assembled folding saw assembly 110; at least one carrying case; and at least one set of user instructions. The kit has instructions such that functional relationships are detailed in relation to the structure of the invention (such that the invention can be used, maintained, or the like in a preferred manner). Folding handsaw pack-pole system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
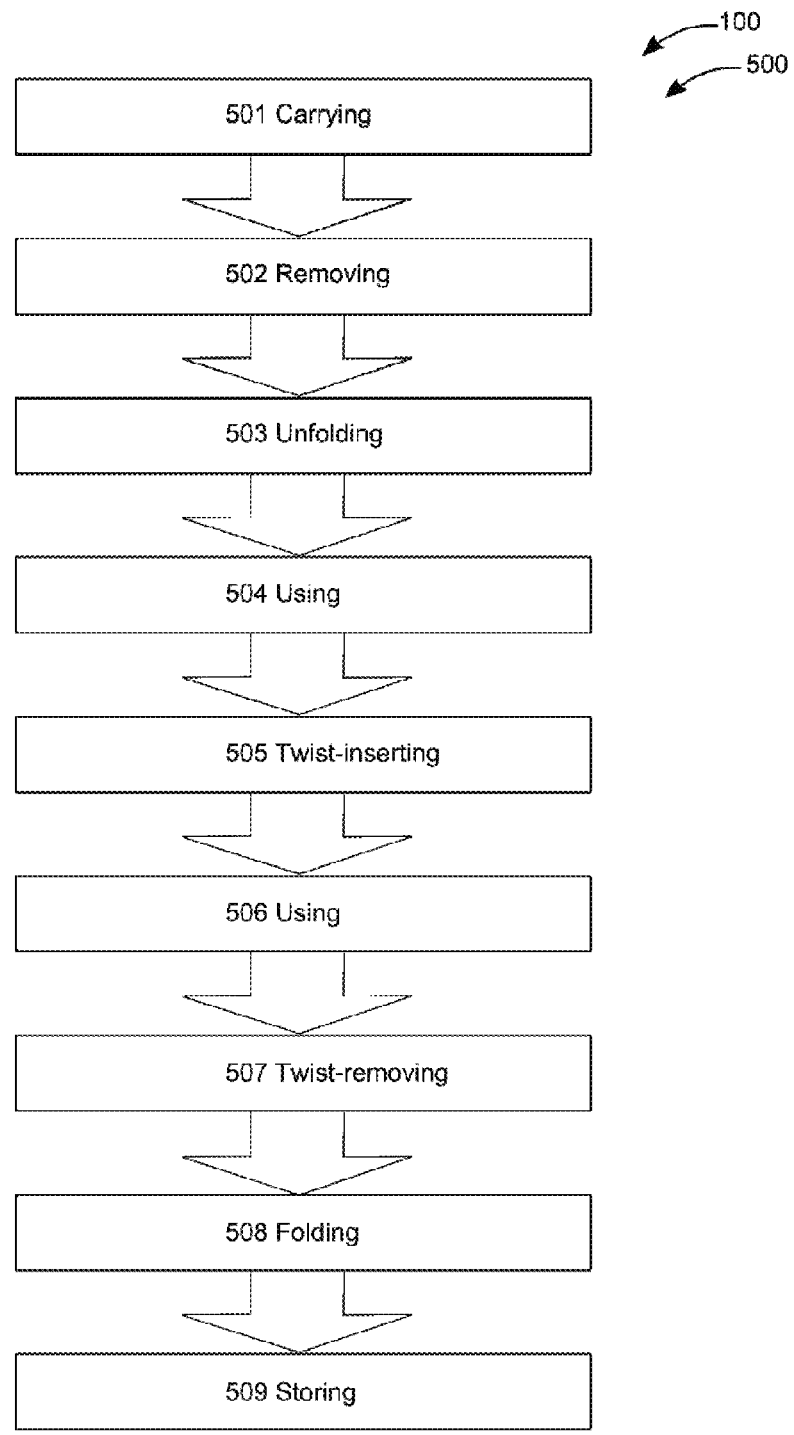
FIG. 5 is a flowchart illustrating a method of use for folding handsaw pack-pole system according to an embodiment of the present invention of FIGS. 1-4.

Referring now to FIG. 5, showing method of use 500 for folding handsaw pack-pole system 100. A method (method of use 500) of using folding handsaw pack-pole system 100 may comprise the steps of step one 501 carrying a folded folding saw assembly 110 in a carrying case to a location of use; step two 502 removing folding saw assembly 110 from the case; step three 503 unfolding folding saw assembly 110; step four 504 using folding saw assembly 110 to cut pole-branch 120 for use as an extension handle; step five 505 twist-inserting the cut pole-branch 120 into pole receiver 200 within handle 180 of folding saw assembly 110; step six 506 using folding saw assembly 110 with an attached pole-branch 120 for cutting vegetation branches that are beyond a user's 130 unaided reach to clear a path for unobstructed shooting of a game animal; step seven 507 twist-removing pole-branch 120 and discarding; step eight 508 folding and inserting folding saw assembly 110 into the carrying case; and step nine 509 storing folding saw assembly 110.

It should be noted that step 504-506 are optional steps and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A folding handsaw pack-pole system comprising:
   a folding saw assembly comprising;
      a saw blade having;
         a first end having;
            a first hinge orifice
         a second end; and
         a cutting edge;
      a pivot hinge;
      a hinge release button;
      a handle comprising;
         a left side;
         a right side;
         a proximate end having;
            a pole receiver having;
            a wood screw; and
         a distal end comprising;
            a second hinge orifice; and
         a grip;
   wherein said folding hand saw pack pole system comprises said folding saw assembly for a hunter to compactly carry a folded said folding saw assembly to a location for use to cut wood;
   wherein said saw blade is pivotally attached to said handle such that said saw blade is able to be nestably folded substantially within said handle between said right side and said left side of said handle for safely-concealing said cutting edge;
   wherein said saw blade comprises a flat shank having said first hinge orifice located within said first end of said saw blade such that said pivot hinge is able to pivotally attach said first hinge orifice to said second hinge orifice of said distal end of said handle;
   wherein said hinge release button is located adjacent to said pivot hinge and is able to lock said pivot hinge, and therefore said saw blade, in a folded position and alternately in an open position in relation to said handle;
   wherein said second end of said saw blade comprises a tip adjacently located to said cutting edge, said cutting edge located between said first end and said second end of said saw blade along an inside edge;
   wherein said proximate end of said handle comprises said pole receiver, said pole receiver comprising a cylindrical inner volume having a circular opening at said proximate end of said handle such that said pole receiver is able to receive a pole-branch cut from a tree at a location of use for use as a handle extension to reach stalk vegetation to be cut that is beyond a reach of a user;
   wherein said wood screw is concentrically located and non-removably attached to a recess end of said handle, said recess end interiorly located within said pole receiver, such that a point of said wood screw faces outwardly toward said proximate end from said recess end;
   wherein said grip of said handle comprises a non-slip form about an outer periphery of said handle such that a user is able to leverage-grip said handle to prevent an axial rotation of said handle of said folding saw assembly during use; and
   wherein said folding saw assembly is useful for carrying in a folded condition when not in use such that said user is unencumbered by carrying said folding saw assembly and able to simultaneously perform other tasks.

2. The folding handsaw pack-pole system of claim 1 wherein said folding saw assembly is about 17 inches long in a fully extended position.

3. The folding handsaw pack-pole system of claim 1 wherein said saw blade comprises tempered steel such that said blade is durable during heavy saw-cutting use.

4. The folding handsaw pack-pole system of claim 1 wherein said wood screw within said pole receiver comprises steep threads such that said pole-branch is able to be rotationally inserted to into said pole receiver and said wood screw quickly twist-inserted into an insertion end of said pole-branch to firmly attach said folding saw assembly to said pole-branch.

5. The folding handsaw pack-pole system of claim 1 wherein said cutting edge is about 7 inches long and comprises a plurality of cutting teeth.

6. The folding handsaw pack-pole system of claim 5 wherein a plurality of said cutting teeth of said cutting edge each comprise an inverted M-profile.

7. The folding handsaw pack-pole system of claim 1 wherein said hinge release button is located adjacent to said pivot hinge on a back spine of said handle.

8. The folding handsaw pack-pole system of claim 1 wherein said pivot hinge together with said hinge release button comprises multiple blade lock positions.

9. The folding handsaw pack-pole system of claim 5 wherein said cutting edge comprises a slight inwardly arcuate profile.

10. The folding handsaw pack-pole system of claim 1 wherein said handle further comprises a forward handle portion located at said distal end of said handle and a pole receiver portion located at a proximate end of said handle.

11. The folding handsaw pack-pole system of claim 10 wherein said pole receiver portion of said handle is about 4 inches long and about 1½ inches inside diameter and comprises a cylindrical shape, said pole receiver portion larger in size than said forward handle portion.

12. The folding handsaw pack-pole system of claim 10 wherein said forward handle portion is about 1 inch thick and comprises a cross-sectional profile such that a width of said forward handle portion is greater than said thickness of said forward handle portion.

13. The folding handsaw pack-pole system of claim 4 wherein said wood screw is about 1½ inches long.

14. The folding handsaw pack-pole system of claim 10 wherein said handle comprises hardened plastic such that said folding saw assembly is light weight and of sufficient strength to resist bend pressure.

15. The folding handsaw pack-pole system of claim 1 wherein said hinge release button comprises a hinged thumb lever, said hinged thumb lever hingedly operational in a movement coplanar with said back spine of said handle.

16. The folding handsaw pack-pole system of claim 3 wherein said saw blade further comprises a blade back.

17. The folding handsaw pack-pole system of claim 16 wherein said blade back of said saw blade comprises a curvature arcuately extending progressively toward said cutting edge from said first end, and progressively curves within about an inch from said second end to intersect said cutting edge at said tip.

18. A folding handsaw pack-pole system comprising:
- a folding saw assembly comprising;
  - a saw blade having;
    - a first end having;
      - a first hinge orifice
    - a second end; and
    - a cutting edge;
  - a pivot hinge;
  - a hinge release button;
  - a handle comprising;
    - a left side;
    - a right side;
    - a proximate end having;
      - a pole receiver having;
      - a wood screw; and
    - a distal end comprising;
      - a second hinge orifice; and
    - a grip;
- wherein said folding hand saw pack pole system comprises said folding saw assembly for a hunter to compactly carry a folded said folding saw assembly to a location for use to cut wood;
- wherein said folding saw assembly is about 17 inches long in a fully extended position;
- wherein said saw blade is pivotally attached to said handle such that said saw blade is able to be nestably folded substantially within said handle between said right side and said left side of said handle for safely-concealing said cutting edge;
- wherein said saw blade comprises a flat shank having said first hinge orifice located within said first end of said saw blade such that said pivot hinge is able to pivotally attach said first hinge orifice to said second hinge orifice of said distal end of said handle;
- wherein said cutting edge comprises a slight inwardly arcuate profile;
- wherein said saw blade further comprises a blade back;
- wherein said blade back of said saw blade comprises a curvature arcuately extending progressively toward said cutting edge from said first end, and progressively curves within about an inch from said second end to intersect said cutting edge at said tip;
- wherein said hinge release button is located adjacent to said pivot hinge on a back spine of said handle;
- wherein said hinge release button comprises a hinged thumb lever, said hinged thumb lever hingedly operational in a movement coplanar with said back spine of said handle;
- wherein said pivot hinge together with said hinge release button comprises multiple blade lock positions;
- wherein said saw blade comprises tempered steel such that said blade is durable during heavy saw-cutting use;
- wherein said hinge release button is located adjacent to said pivot hinge and is able to lock said pivot hinge, and therefore said saw blade, in a folded position and alternately in an open position in relation to said handle;
- wherein said second end of said saw blade comprises a tip adjacently located to said cutting edge, said cutting edge located between said first end and said second end of said saw blade along an inside edge;
- wherein said cutting edge is about 7 inches long and comprises a plurality of cutting teeth;
- wherein a plurality of said cutting teeth of said cutting edge each comprise an inverted M-profile;
- wherein said handle further comprises a forward handle portion located at said distal end of said handle and a pole receiver portion located at a proximate end of said handle;
- wherein said handle comprises hardened plastic such that said folding saw assembly is light weight and of sufficient strength to resist bend pressure;
- wherein said forward handle portion is about 1 inch thick and comprises a cross-sectional profile such that a width of said forward handle portion is greater than said thickness of said forward handle portion;
- wherein said proximate end of said handle comprises said pole receiver, said pole receiver comprising a cylindrical inner volume having a circular opening at said proximate end of said handle such that said pole receiver is able to receive a pole-branch cut from a tree at a location of use for use as a handle extension to reach stalk vegetation to be cut that is beyond a reach of a user;
- wherein said pole receiver portion of said handle is about 4 inches long and about 1½ inches inside diameter and comprises a cylindrical shape, said pole receiver portion larger in size than said forward handle portion;
- wherein said wood screw is concentrically located and non-removably attached to a recess end of said handle, said recess end interiorly located within said pole receiver, such that a point of said wood screw faces outwardly toward said proximate end from said recess end;
- wherein said wood screw is about 1½ inches long;
- wherein said wood screw within said pole receiver comprises steep threads such that said pole-branch is able to be rotationally inserted to into said pole receiver and said wood screw quickly twist-inserted into an insertion end of said pole-branch to firmly attach said folding saw assembly to said pole-branch;
- wherein said grip of said handle comprises a non-slip form about an outer periphery of said handle such that a user is able to leverage-grip said handle to prevent an axial rotation of said handle of said folding saw assembly during use; and
- wherein said folding saw assembly is useful for carrying in a folded condition when not in use such that said user is unencumbered by carrying said folding saw assembly and able to simultaneously perform other tasks.

19. The folding handsaw pack-pole system of claim 18 further comprising a kit including:
- at least one fully assembled said folding saw assembly;
- at least one carrying case; and
- at least one set of user instructions.

* * * * *